United States Patent

Friars et al.

Patent Number: 6,013,524
Date of Patent: Jan. 11, 2000

[54] LIVING AIR FRESHENER

[75] Inventors: Gary Friars, Midland Park, N.J.;
Robert P. Manzo, Goshen, N.Y.; Gary Titus, Wayne, N.J.

[73] Assignee: Dragoco, Inc., Totowa, N.J.

[21] Appl. No.: 09/008,772

[22] Filed: Jan. 19, 1998

[51] Int. Cl.[7] .............. C12N 5/00; A01G 9/02; A01G 31/02

[52] U.S. Cl. .............. 435/420; 435/410; 47/65.5; 47/66.6

[58] Field of Search .............. 435/410, 420; 47/65.5, 66.6

[56] References Cited

U.S. PATENT DOCUMENTS

| | | | |
|---|---|---|---|
| 5,057,424 | 10/1991 | Knuth et al. | 435/410 |
| 5,278,141 | 1/1994 | Berliner | 512/3 |
| 5,321,908 | 6/1994 | Ushimaru | 47/69 |
| 5,434,122 | 7/1995 | Lorina et al. | 424/195.1 |

*Primary Examiner*—Leon B. Lankford, Jr.
*Assistant Examiner*—Christopher R. Tate
*Attorney, Agent, or Firm*—Pendorf & Cutliff

[57] ABSTRACT

A living air freshener comprising a dwarf flowering plant such as a miniature rose plant rooted in a transparent or non-transparent growth medium in a transparent vessel, with a natural or artificial fragrance composition added directly to the growth medium or to a second compartment in said vessel. The invention also concerns a sealed package for shipping and displaying the living air freshener, which package can be easily opened to activate and/or release fragrance.

8 Claims, 1 Drawing Sheet

LIVING AIR FRESHENER

BACKGROUND OF THE INVENTION

1. Field of the Invention

The invention concerns a novel self-contained air freshener which provides a natural or artificial air freshening fragrance in combination with the beauty of a living dwarf flowering plant. The invention also concerns a sealed package for shipping and displaying the living air freshener, which package can be easily opened to activate and/or release fragrance.

In one preferred embodiment the dwarf flowering plant is a miniature rose plant and the fragrance composition is added directly to the growth medium, but it is obvious that the fragrance composition may be added to a separate compartment in the vessel. The growth medium and vessel are preferably transparent, but may be tinted or non-transparent.

2. Discussion of Related Art

Flowers have both aromatic and visual mood enhancing properties. A bouquet of flowers will enhance the atmosphere of an entire room. However, for a variety of reasons, the indoor display of living flowers is limited.

First, living flowers, and particularly valuable ornamental flowers, require care if they are to be kept alive. There are thus two options—buying expensive cut flowers with the understanding that they are to be disposed of in a matter of days, or buying potted flowers with the understanding that they must require years of care. Potted flowers are bulky, and many people do not have the time or talent to care for living flowers.

Accordingly, in view of the problems associated with living plants, many people have settled on imitation flowers which require little or no care. Most imitation flowers emit no fragrance.

It is also known to provide artificial fragrance dispensers which emit the fragrance of flowers. However, most of these fragrance dispensers or air fresheners are in shapes other than flowers. U.S. Pat. No. 4,663,081 (Grimshaw, et al.) and U.S. Pat. No. 3,994,439 (Van Breen, et al.) teach liquid and solid compositions, respectively, suitable for use in an air freshener. The compositions provide continuous release of fragrance. U.S. Pat. No. 5,114,625 (Gibson) and U.S. Pat. No. 5,081,104 (Orson, Sr.) disclose fragrance dispensers for circulating air and evaporating an aromatic fluid into the air. Aromatic fluid which is drawn upwardly by a wick is exposed to the flow of air provided by a fan. The rate or time of fragrance release can be controlled. However, this type of device does not provide a flower display, and requires electricity to operate. It is also sometimes difficult to tell precisely when to refill the aromatic fluid.

It is also known to combine visual and aromatic effects in scented artificial flower, for example, as disclosed in U.S. Pat. Nos. 4,919,981 (Leavey, et. al.) and 5,077,102 (Chong). While scented artificial flowers are low maintenance, they do not provide the same visual or olfactive effect as real flowers.

There is an effect that only real flowers can provide. Flowering plants are grown year round in greenhouses, and are distributed through nurseries or florists to the consumer. A peculiar property of flowers grown in greenhouses is that they have little or no fragrance. In response, devices have been developed which combine the functions of floral display and artificial fragrance dispenser. For example, U.S. Pat. No. 5,353,546 (Bock) teaches a combination vase and air fragrance dispenser comprising two vessels, one for holding natural or artificial flowers, the other for holding a fragrance emitting material. The two-vessel construction ensures complete separation between flower and air treatment material, preventing contamination of the flowers. The flower holding vessel is capable of receiving water needed to keep natural flowers fresh. Thus, this device is concerned with the display of cut flowers, which have a short life.

U.S. Pat. No. 5,477,640 (Holtkamp, Jr.) teaches a fragrance emitting plant watering system, wherein a potted natural flowering plant is seated within a larger vase-like solid fragrance emitter. A wick transports water from a water reservoir to a potted plant. An air freshener cartridge for emitting a fragrance is provided in a separate compartment of the device. The device however greatly and unnecessarily increases the size of the vase and provides a proportionately small space in which to place the potted flowering plant. This renders the device unsuitable for display in areas where space is limited, such as in office cubicles. The device is also uneconomical due to the expense of manufacturing such a complex device.

Accordingly, there is a need for a combination flower display and fragrance emitter which is inexpensive, attractive, relatively small in size, and easy to maintain.

SUMMARY OF THE INVENTION

The present invention is made based upon the discovery that a superior living air freshener can be made by providing:

- a vessel, which may or may not be transparent;
- a growth medium, which may or may not be relatively transparent;
- a dwarf plant, preferably a valuable flowering ornamental plant such as a rose, an orchid, a chrysanthemum, or the like; and
- a fragrance, artificial or derived from nature, most preferably inert and compatible with the plant,
- wherein the fragrance is provided in a compartment separate from the growth medium or, preferably, in the growth medium.

The invention also concerns a sealed package for shipping and displaying the living air freshener, which package can be easily opened to activate and release fragrance.

In the case that the fragrance is provided in the growth medium which sustains the plant, the vessel is a single chamber vessel and thus less complex and more compact. The growth medium serves as the matrix for the fragrance. The device is thus simple, functional, and inexpensive. This is believed to be attributable primarily to the moistening of the nutrient medium, and in small part to the transpiration of small molecular weight aromatic compounds through the plants to the surfaces of flowers or leaves.

In accordance with the present invention, the device is small in size, attractive in appearance, and fragrance release is accomplished without use of a heater element or fan. The plant is a living plant and thus elicits a greater response in humans than artificial plants.

The plant and aromatic formulation are preferably so selected, that both have the same life expectancy, preferably about 2–6 weeks under normal conditions of use. If the plant exhausts nutrients at the same time that the device ceases to emit fragrance, the owner recognizes that it is time to obtain a new air freshener. The old dispenser can be discarded or the plant may be transplanted to a potting soil or to an outdoor flower bed.

Further, the use of a living plant, particularly a high value plant such as a rose or orchid, enhances the attractiveness and value of the air freshener. The present invention solves two problems associated with tissue cultured plants—the cost of transplanting to potting soil, and the lack of fragrance characteristic of greenhouse plants. The present invention solves these problems by leaving the plants in nutrient medium and by adding fragrance.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other living air fresheners for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

Figure 2:
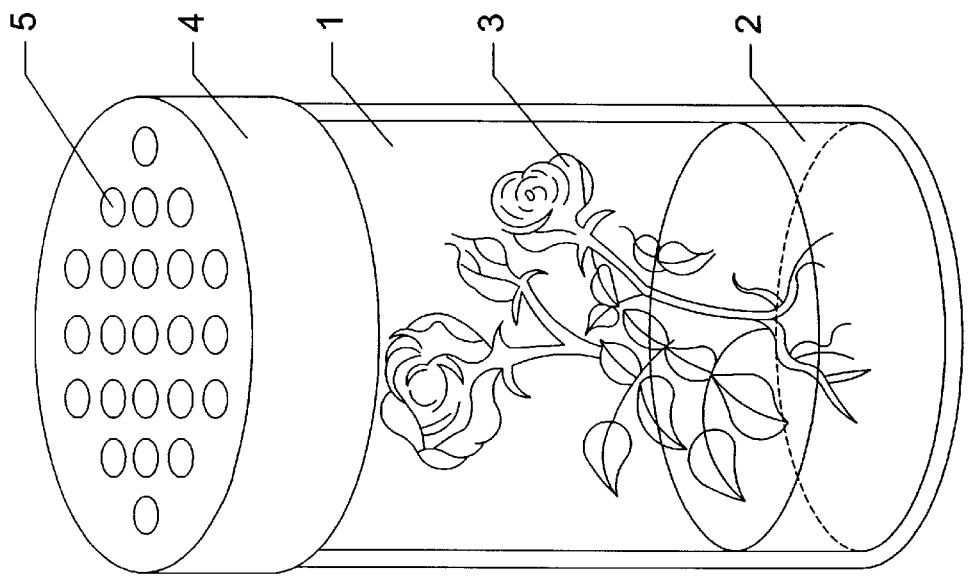
FIG. 2 shows the combination of FIG. 1, with seal removed.

Marketers of air fresheners have been searching for the perfect marriage of air freshening and nature. To date fragrance suppliers have been able to capture the natural essence or aroma of living flowers through headspace techniques; however, the essences are then placed in synthetic bases which then dilute the living flower message. The present invention provides an exciting new living vehicle to deliver air freshening, and represents the next stage of innovation, novelty and technology in this art.

The present invention provides a living air freshener which offers both an attractive flower display and a natural or artificial air freshening fragrance. The product will actually grow, flower, and die providing both air freshening and a visual signal for when the product needs to be replaced. The present invention thus solves the problem commonly associated with "plug-ins" and passive air fresheners—the lack of a clear accurate signal indicating when the product needs to be replaced. The pleasure of watching a plant grow is self-explanatory.

The present invention is accomplished by the combination of air freshener functions with a small living ornamental flowering plant. The plant may be any small conventional flowering plant, but for commercial reasons higher value plants, and particular novelty plants which are miniature either by traditional breeding techniques or genetic manipulation (e.g., by expression of dwarfism genes) are preferably used.

The demand and value of high quality ornamental plants has fueled the development of tissue culture techniques for true-to-type disease-free propagation of ornamental plants. Entire industries have been set up around the tissue culture propagation of high value ornamental plants such as roses, chrysanthemum, gerbera, carnation, lilies, and gladiolas. Miniaturized plants, when propagated through tissue culture techniques, retain their micro or mini-micro shapes. These plants provide a floral display even when small in size (1–5 inches in height) and thus do not take more space than required of a traditional fragrance dispenser or air freshener.

Although plants such as roses or chrysanthemums have traditionally been considered high value and thus non-disposable, the ability to mass-produce these plants by tissue culture has greatly reduced the cost of individual plants, such that it becomes preferable to employ such plants in the present invention. A part of the cost associated with retail sales of plants propagated through tissue culture is associated with the need to grow the plants to the size and heartiness necessary for assured survival indoors or outdoors. In accordance with the present invention, since the air freshener is intended to be short-lived and disposable, it is no longer necessary to grow the plants to the point of ensuring long term viability of the plants. Rather, it is merely necessary that the plants are grown to the point at which flowering occurs. It is also not necessary to transplant the plants to potting soil to develop root structures for subsequent transplanting, as the present invention concerns a air freshener which is designed to be disposable.

As the plants to be used in the air freshener in accordance with the present invention, plants with sentimental value, such as roses, are preferred for commercial reasons. Air fresheners including roses can be sold as every-day air fresheners, as well as for special occasions such as Mother's Day, Valentine's Day, birthdays, anniversaries, etc. Chrysanthemums are also popular, and are known for their aromatic fragrance.

Dwarf, miniature, and micro-miniature roses are well known and can be found in, e.g., U.S. Plant Patents PP6,165; PP8,742; PP6,875; PP4,029; PP7,894; PP10,015, PP10,014; PP10,002; PP9,973; PP9,652; PP9,414; PP9,033 and PP9,000. The invention is not limited to roses and includes, e.g., dwarf petunias as disclosed in U.S. Pat. No. 5,523,520, and other plants such as orchids and chrysanthemums discussed herein.

The techniques for tissue culture of dwarf plants are known and need not be described herein in detail. Nutrient media are prepared depending upon the species of plant being tissue cultured and the culture technique employed. Perhaps the most popular media is based upon that disclosed in Murashige and Skoog, "A Revised Medium for Rapid Growth and Bioassays with Tobacco Tissue Culture", Physiol. Plant, 15;473–497 (1962). Basic ingredients include Murashige and Skoog salts (MS salts), thiamine, myo-inositol stock, sucrose, nicotinic acid, glycine, and plant hormones such as giberelic acids (GA3) for cell elongation, auxins such as indole-acetic acid (IAA), indole-3-butyric acid (IBA), and kinins or cytokinins such as 6-benzyladenine (BA), and 6-benzylaminopurine (BAP) for overall growth of cells. In order to promote well proportioned shoots and roots these three groups of hormones should be given at proper ratios.

Tissue culture techniques are described in detail in literature, and reference may be made to:

Walter, Kamp, and Smith, *In Vitro Propagation of Rosa chinesis, Jacq. var minima "Red Cascade"* Journal of the Rio Grande Valley Horticultural Society, Vol. 33, pp. 125–127 (1979).

Dubois, Roggemans, Soyeurt and DeVries, *Comparison of the Growth and Development of Dwarf Rose Cul-*

*tures Cut In Vitro and In Vivo by Softwood Cuttings*, Scientia Horticulturae, Vol. 35 pp. 293–299, (1988).

Walter, Camp and Smith, *In Vitro Preparation of Rosa Chinenisis, Jacq, var. minima "Red Cascades"*, Journal of the Rio Grande Valley Horticultural Society, Vol. 33, pp. 125–128 (1979).

Hasegawa, *In vitro Propagation of Rose*, HortScience, Volume 14, pp. 610–612 (1979).

Skirvin and Chu, *In Vitro Propagation of "Forever Yours" Rose*, HortScience, Vol. 14, pp. 608–610 (1979).

Grewal, Gosal, Arora and Singh "Propagation of Ornamental Plants through Tissue Culture" in "Plant Tissue Culture," Science Publisher, Inc., pp. 36–41 (1996).

Prakash, Lee, Loh and Goh "In Vitro Propagation of Commercial Orchids: An assessment of Current Methodologies and Development of a Novel Approach—Thin Cross-section Culture" in "Plant Tissue Culture," Science Publisher, Inc., pp. 42–49 (1996).

Smith, "Clonal Propagation of Ornamentals—Rose" In: "Plant Tissue Culture", Ch. 9, pp. 118–119 (1992).

Narayanaswamy, "Regeneration of Plants from Tissue Cultures" In: "Applied and Fundamental Aspects of Plant Cell Tissue and Organ Culture", edited by Reinert and Bajaj, Springer Verlag, Berlin, pp. 179–206 (1977).

Additional general plant culture techniques are disclosed in U.S. Pat. No. 4,531,324 "Plant Tissue Culture Device"; U.S. Pat. No. 5,324,657 "Apparatus for Plant Cell Tissue Culture"; U.S. Pat. No. 5,657,577 "Process for Growing Tissue Cultured Plants"; U.S. Pat. No. 5,597,731 "Plant Propagation System"; U.S. Pat. No. 5,525,505 "Plant Propagation System and Method"; and U.S. Pat. No. 4,908,315 "Integument and Method for Micropropagation and Tissue Culturing".

Miniature roses cultured from tissue culture are also available commercially as Rose Naturel®, a miniature rose plant approximately 2–4 cm in height, available from Nova-Flora of Philadelphia, Pa. NovaFlora has developed technology useful for producing miniature flower bearing rose plants in enclosed vessels. These plants have little fragrance and have been sold at about 4 inches in height in potting soil. The present invention differs primarily by the addition of fragrance substances, preferably directly to the nutrient medium, but also by the novel packaging and display, by the ability to use less developed plants (particularly plants with less developed root systems), and by the preference for transparent nutrient medium or agar, or transparent hydrogel potting medium as disclosed in, e.g., U.S. Pat. No. 5,382,270 "Plant Growth Media Comprising Cross-Linked Hydrogel Particles".

The optional transparent or tinted nutrient medium need not be the same complex salt, hormone and nutrient fortified agar tissue culture medium in which the plantlets are initially grown. Rather, it may be a much simpler agar, or even a cornstarch based gelling mixture as disclosed in "Tissue-Culturing Plants on Cornstarch", Agricultural Research, July 1995, page 11, developed by Ingrid Fordham, a horticulturist with the USDA Agricultural Research Service, Fruit Laboratory in Beltsville, Md.

As discussed above, plants grown in greenhouses are deficient in aromatic properties as compared to plants grown outdoors. Accordingly, in the present invention, aromatic fragrance compositions are added to the growth medium, preferably immediately prior to shipping. The gelatinous medium is highly suited to the addition of fragrances, insect repellents, human sex pheromones, and other bioactive volatile compounds. In a preferred embodiment of the invention, the aromatic compounds are natural or artificial compounds which are chemically relatively inert to the plant, such that the compounds can be added directly to the growth medium. However, it is obvious that the aromatic composition can be added to a separate chamber or compartment of the display vessel in a case that the aromatic composition is adversely affected by periods of watering of the plant, or the chemistry of the aromatic compound is adverse to the plant roots. The fragrance releasing chamber can be separated from the plant growth medium by an impermeable barrier, such as a plastic membrane, by a semipermeable barrier, such as paper or cellophane, or merely by space, e.g., by coating the interior lining of the container with fragrance compounds prior to addition of nutrient medium.

Another advantageous property of the present invention is comprised of the combination effect of the fragrance produced by the living plant and the fragrance added to the growth medium. It is well known in the perfume industry to capture, identify, and synthesize compounds released by flowers (headspace techniques). In accordance with the present invention, a small fraction of the final fragrance is produced by the plant and the greater part of the detected fragrance is produced by the fragrance compound added to the growth medium. Thus, new and exciting fragrance concepts are possible.

It is not necessary that the fragrance naturally associated with a given plant be added to the growth medium. So it is possible to add, for example, a vanilla fragrance to a rose plant, to add a lemon fragrance to a chrysanthemum, or to add a cinnamon fragrance to an orchid.

The chemicals or substances which are used to produce a desired fragrance may be any one or more of those which are commonly used by those skilled in the art of fragrance chemistry or perfumery, some of which are listed in the following texts:

Robert R. Calkin, J. Stephan Jellinek, *Perfumery, Practice & Principle*, John Wiley and Sons, Inc. New York, 1994;

Rudiger Hall, Dieter Klemme, Jurgen Nienhaus, *Guide to Fragrance Ingredients*, H&R Edition, R. Gross & Co. Publishing, Hamburg, 1985;

Julia Muller, *The H&R Book of Perfume*, H&R Edition, Johnson Publications, Ltd., London, 1984;

*Fragrance Guide-Feminine Notes, Masculine Notes*, H&R Edition, R. Gross & Co. Publishing, Hamburg, 1985 each of which are incorporated herein by reference.

It is specifically intended that the present invention not be limited to any particular fragrance or combination of fragrances, whether known or discovered in the future since any fragrance or chemical substances which humans find pleasant and desirable to inhale are within the scope of the present invention.

Specific examples of fragrance materials suitable for use in the present invention include:

TABLE 1

| Natural Fragrances |
|---|
| Ambrette seed |
| Armoise |
| Basil |
| Bay |

TABLE 1-continued

Natural Fragrances

Benzoin Siam
Bergamot
Birch tar
Camomile Roman
Cardamon
Cassis bourgeons (base)
Castoreum
Cedarwood Virginian
Celery seed
Cinnamon leaf
Cinnamon bark
Cistus oil
Civet
Clary sage
Clove bud
Coriander
Costus (base)
Cumin
Estragon
Galbanum oil
Geranium Bourbon
Guaiacwood
Iris concrete
Jasmin absolute
Labdanum extract
Lavender
Lavandin
Lemon
Lemongrass
Lime West Indian
Mandarin
Mimosa absolute
Neroli
Nutmeg
Oakmoss absolute
Olibanum extract
Opoponax extract
Orange sweet
Patchouli
Pepper
Peppermint
Peru balsam oil
Petitgrain Paraguay
Pimento
Rose oil
Rose absolute
Rosemary
Rosewood
Sandalwood East Indian
Styrax oil
Tagete
Tonka absolute
Tuberose absolute
Thyme
Vanilla absolute
Vetyver Bourbon
Violet leaf absolute
Ylang extra

TABLE 2

Synthetic Fragrances

Acetophenone
Aldehyde $C_{10}$
Aldehyde $C_{11}$ undecylenic
Aldehyde $C_{12}$ lauric
Aldehyde $C_{12}$ MNA
Aldehyde $C_{14}$ (gamma-undecalactone)
Aldehyde $C_{16}$
Aldehyde $C_{18}$ (gamma-nonalactone)
Allyl cyclohexyl propionate

TABLE 2-continued

Synthetic Fragrances

Ambroxan
Amyl cinnamic aldehyde
Amyl salicylate
Anisaldehyde
Aurantiol
Benzaldehyde
Benzyl acetate
Benzyl salicylate
Brahmanol
Calone
Cashmeran
Cedramber
Cedryl acetate
Cinnamic alcohol
Citral
Citronellal
Citronellol
Citronellyl acetate
Coumarin
Cyclamen aldehyde
Cyclopentadecanolide
Damascone beta
Dihydromyrcenol
Dimethyl benzyl carbinyl acetate
Diphenyl oxide
Ethyl phenylacetate
Ethyl vanillin
Eugenol
Evernyl
Frambinone
Galaxolide
gamma-Decalactone
Geraniol
Geranyl acetate
Geranyl formate
Geranyl nitrile
Greenyl acetate
Hedione
Helional
Heliotropin
cis-3-Hexenyl acetate
cis-3-Hexenyl salicylate
Hexyl cinnamic aldehyde
Hexyl salicylate
Hivertal
Hydroxycitronellal
Indol
Ionone alpha
Isobornyl acetate
Iso butyl quinoline
Isoeugenol
Iso E super
Isogalbanate
cis-Jasmone
Lilial
Linalool
Linalyl acetate
Lyral
Maltol
Methyl Anthranilate
Methyl benzoate
Methyl cinnamate
Methyl chavicol
Methyl ionone gamma
Methyl napthyl ketone
Methyl octine carbonate
Methyl salicylate
Musk ketone
Musk T
Paracresyl acetate
Phenoxyethyl isobutyrate
Phenylacetaldehyde
Phenylacetic acid
Phenylacetaldehyde dimethyl acetal
Phenylethyl acetate

TABLE 2-continued

Synthetic Fragrances

Phenylethyl alcohol
Phenylethyl dimethyl carbinol
Phenylethyl phenylacetate
Phenylpropyl alcohol
Rosalva
Rosatol
Rose oxide
Sandela
Styrallyl acetate
Terpineol
Tonalid
Vanillin
Vertacetal
Vertofix
Vetiveryl acetate
Vertenex (PTBCHA)

It is also intended that for certain applications, chemicals which do not produce a detectable scent but instead produce certain biological or psychological effects may be incorporated into the fragrance reservoir alone or in combination with fragrance-producing chemicals. These substances include, but are not limited to pheromones which may alter the physiology of the body, mood-altering substances, organ extracts, plant extracts, or other materials or chemicals which provide a desired biological or psychological effect. The use of the term "fragrance" or "fragrance chemicals" herein includes these substances as well.

The fragrance chemicals may have a variety of physical forms which include, but are not limited to: liquid, gel, cream or other semisolid, solid, powder or gas. Additionally, the fragrance chemicals may be encapsulated into small or microscopic "beads" or enclosures using any technique commonly used for chemical encapsulation. It will be recognized that fragrance chemicals may be mixed or combined with various solvents, diluents, or other substances which act to dissolve the fragrance chemicals or alter their intensity, stability, viscosity, rate of release or other physical or chemical characteristics.

The growth medium can be colored with commonly available pigments to enhance the appearance of the product. Addition of low molecular weight pigments to nutrient medium may sometimes cause coloration changes in flowers, particularly where pigments are dark and flowers are light in color. If modification of flower color is desired, this can be more reliably accomplished by environmental manipulation, cross breeding, or genetic engineering of genes associated with pigment expression. The United States Department of Agriculture, Agricultural Research Service, employs scientists working with color genes. Genetic engineering can now be used to create novel flower colors. Foreign flower colors can now be easily introduced to any species. Hank Becker, "Plant Pigment Puzzle Complete", Agricultural Research, July, 1996, page 12 discloses that the mixing and matching of three pigments, chlorophyll, flavonoids, and carotonoids, in different proportions, gives an endless array of different colors. Plant flower color is also influenced by the cellular environment, especially the pH of the plant and the presence of metal ions.

The container is preferably constructed so that the plant is visible at the point of sale, and so that the package can be easily opened to reveal and display the air freshener. For example, a transparent semi-permeable membrane can be used to cover and seal the open end of a tube containing the plant such that volatile compounds placed in the medium will diffuse freely from the opened product.

The vessel containing the growth medium and the plant is preferably sealed with a easily removable foil for shipment. After sale, the foil is simply removed, exposing the flower and releasing the fragrance. By selecting the appropriate fragrance composition and growth medium, the release rate of the fragrance can be controlled such as to provide sustained release for a period of 1 to 8 weeks, preferably 4 to 6 weeks. The living air freshener can be watered from the top to prolong the life of the plant and possibly to stimulate release of aroma. The living air freshener could also be provided with an easily removable foil on the lower surface of the container, such that the user has the option of removing the lower foil and exposing perforations through the lower surface of the container, then placing the container in a shallow saucer of water, such that the living air freshener is self-watering by absorbing water into the growth medium through perforations at or near the lower surface of the container.

As to the manner of usage and operation of the two embodiments of the present invention described above, the same should be apparent from the above description and the following Example.

EXAMPLE

A dwarf rose cultivar Bambino is micropropagated in vitro using the tissue culture methods set forth in Dubois, Roggemans, Soyeurt and DeVries, *Comparison of the Growth and Development of Dwarf Rose Cultures Cut In Vitro and In Vivo by Softwood Cuttings*, Scientia Horticulturae, Vol. 35 pp. 293–299, (1988).

Separately, sufficient rose oil obtained from Dragoco is added to a cornstarch based gelling mixture as disclosed in "Tissue-Culturing Plants on Cornstarch", Agricultural Research, July 1995, page 11, developed by Ingrid Fordham, a horticulturist with the USDA Agricultural Research Service, Fruit Laboratory in Beltsville, Md, to provide a non-intrusive yet noticeable rose aroma. Fungicides may be added at this time.

Figure 1:
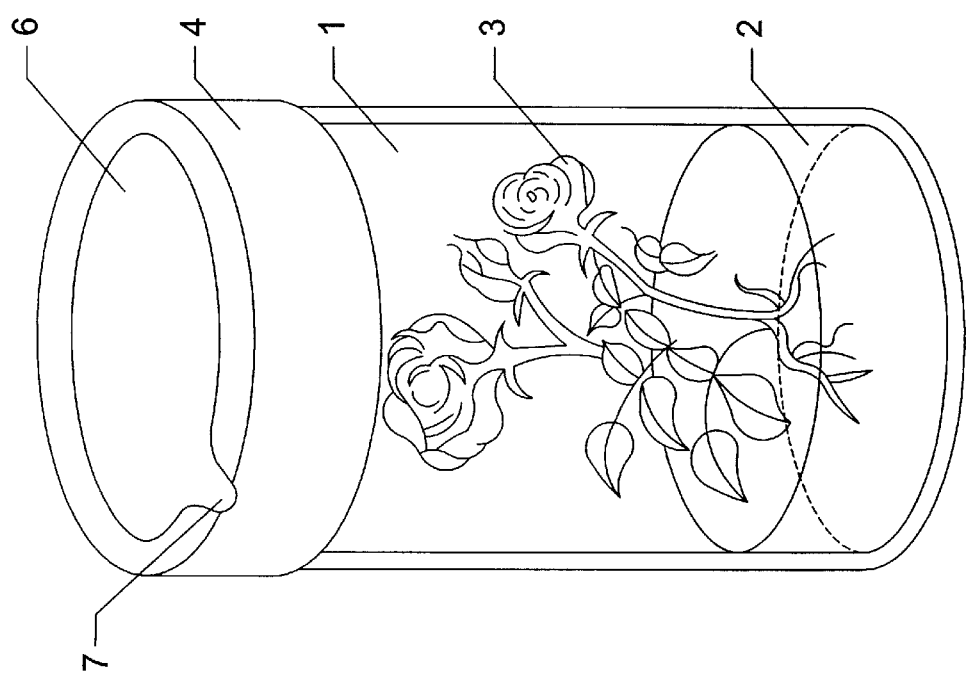
FIG. 1 shows a combination dwarf rose, display container, and fragrance emitter according to the invention, sealed for shipping.

With reference to FIGS. 1 and 2, a transparent container 1 is prepared with a diameter of 7 cm and a height of 12 cm. Into the bottom of this container is added 3 cm of the rose-scented fragrant gelling medium 2, and prior to gelling a 2 cm shoot length micro-rose 3 is transplanted into the medium. The nutrient medium is allowed to gel, and the transparent container 1 is covered with a cap 4. The cap is provided with a number of through holes 5, and in order to prevent release of fragrance the cap is covered with a lightly adhered cover film 6. The cover film 6 is provided with a tab 7 for easy pealing off of the cover film 6 from the cap 4, exposing the holes 5 and allowing the container 1 to vent rose aroma to the atmosphere.

With proper care the micro-rose in the container as packaged for shipping will maintain a relatively fresh appearance for about 3 weeks. Once the cover film is removed, the gel begins to release fragrance and at the same time begins to dry out. Without watering, the rose will last up to 8 weeks. The amount of fragrance released by the gel gradually decreases. At the same time the rose gradually expires, signaling that it is time to obtain a new air freshener.

The life of the living air freshener can be extended by occasional watering, by not placing the air freshener in direct sunlight or currents, by keeping in a cool area, or by placing in a saucer of water, etc.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,
What is claimed is:

1. A living air freshener comprising:

a vessel, a growth medium provided in said vessel, a flowering plant of from 2–12 cm in height rooted in said growth medium, and a fragrance composition added directly to said growth medium.

2. A living air freshener as in claim 1, wherein said plant is a miniature flowering rose plant.

3. A living air freshener as in claim 1, wherein said vessel is transparent.

4. A living air freshener as in claim 1, wherein said fragrance composition is inert with respect to said plant.

5. A living air freshener as in claim 1, wherein fragrance composition is coated on the inside wall of said vessel prior to addition of said growth medium.

6. A living air freshener as in claim 1, wherein the fragrance composition added to said medium produces a fragrance different from the fragrance associated with the flowering plant.

7. A living air freshener as in claim 1, wherein said nutrient medium further includes a human pheromone.

8. A package for shipping and displaying a living air freshener contained therein, and comprising:

a vessel, a growth medium provided in said vessel, a flowering plant of from 2–12 cm in height rooted in said growth medium, a fragrance composition added directly to said growth medium, means for releasably sealing said flowering plant from communication with the atmosphere.

* * * * *